US010832078B2

(12) United States Patent
Cansizoglu et al.

(10) Patent No.: US 10,832,078 B2
(45) Date of Patent: Nov. 10, 2020

(54) METHOD AND SYSTEM FOR CONCURRENT RECONSTRUCTION OF DYNAMIC AND STATIC OBJECTS

(71) Applicant: Mitsubishi Electric Research Laboratories, Inc., Cambridge, MA (US)

(72) Inventors: Esra Cansizoglu, Cambridge, MA (US); Sergio S Caccamo, Stockholm (SE); Yuichi Taguchi, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 63 days.

(21) Appl. No.: 15/674,843

(22) Filed: Aug. 11, 2017

(65) Prior Publication Data

US 2019/0050668 A1    Feb. 14, 2019

(51) Int. Cl.
*G05D 1/02* (2020.01)
*G06K 9/00* (2006.01)
(Continued)

(52) U.S. Cl.
CPC ....... *G06K 9/4633* (2013.01); *G06K 9/00201* (2013.01); *G06K 9/4609* (2013.01);
(Continued)

(58) Field of Classification Search
None
See application file for complete search history.

(56) References Cited

U.S. PATENT DOCUMENTS 9,460,513 B1    10/2016  Ramalingam et al.
2010/0161225 A1  6/2010  Hyung et al.
(Continued)

OTHER PUBLICATIONS

M. Fehr, et al., "TSDF-based Change Detection for Consistent Long-Term Dense Reconstruction and Dynamic Object Discovery," 2017 IEEE International Conference on Robotics and Automation (ICRA), Singapore, May 29-Jun. 3, 2017 (Year: 2017).*
(Continued)

*Primary Examiner* — Soo Shin
(74) *Attorney, Agent, or Firm* — Gennadiy Vinokur; James McAleenan; Hironori Tsukamoto

(57) ABSTRACT

An imaging system for localization and mapping of a scene including static and dynamic objects. A sensor acquires a sequence of frames in motion or stationary. A memory to store a static map of static objects and an object map of each dynamic object in the scene. The static map includes a set of landmarks, and the object map includes a set of landmarks and a set of segments. A localizer registers keypoints of the frame with landmarks in the static map using frame-based registration and to register some segments in the frame with segments in the object map using a segment-based registration. A mapper to update each object map with keypoints forming each segment and keypoints registered with the corresponding object map according to the segment-based registration, and to update the static map with the remaining keypoints in the frame using the keypoints registered with the static map.

20 Claims, 11 Drawing Sheets

(51) Int. Cl.
  *G06K 9/46* (2006.01)
  *G06K 9/62* (2006.01)
  *G06T 7/33* (2017.01)
  *G06T 7/55* (2017.01)
  *G06T 7/73* (2017.01)

(52) U.S. Cl.
  CPC ............ *G06K 9/6215* (2013.01); *G06T 7/337* (2017.01); *G06T 7/55* (2017.01); *G06T 7/75* (2017.01); *G05D 1/0274* (2013.01); *G06T 2207/10016* (2013.01); *G06T 2207/10024* (2013.01); *G06T 2207/10028* (2013.01)

(56) References Cited

U.S. PATENT DOCUMENTS

| | | | | |
|---|---|---|---|---|
| 2012/0121161 | A1* | 5/2012 | Eade | G05D 1/0253 382/153 |
| 2014/0195148 | A1* | 7/2014 | Erignac | G05D 1/0282 701/445 |
| 2015/0304634 | A1* | 10/2015 | Karvounis | G06K 9/00201 348/46 |
| 2016/0012588 | A1* | 1/2016 | Taguchi | H04N 13/257 348/46 |
| 2016/0071318 | A1 | 3/2016 | Lee et al. | |
| 2018/0018805 | A1* | 1/2018 | Kutliroff | G06T 7/90 |
| 2018/0286065 | A1* | 10/2018 | Knorr | G06T 7/277 |
| 2019/0035100 | A1* | 1/2019 | Ebrahimi Afrouzi | G06K 9/00664 |

OTHER PUBLICATIONS

Chieh-Chih Wang et al. "Simultaneous Localization, Mapping and Moving Object Tracking." Carnegie Mellon University Research Showcase @ CMU, Robotics Institute, School of Computer Science. Jun. 2007. http://repository.cmu.edu/robotics.

Moosmann et al. "Joint Self-Localization and Tracking of Generic Objects in 3D Range Data." 2013 IEEE International Conference on Robotics and Automation (ICRA) Karlsruhe, Germany, May 6-10, 2013.

Fehr Marius et al., "TSDF based change detection for consistent long term dense reconstruction and dynamic object discovery," 2017 IEEE International conference on Robotics and Automation, IEEE, May 29, 2017, pp. 5237-5244.

Ataer-Cansizoglu et al., "Object detection and tracking in RGB-D SLAM via hierarchical feature grouping," 2016 IEEE RSJ International Conference on Intelligent Robots and Systems, Oct. 9, 2016. pp. 4164-4171.

Finman Ross et al., "Toward Lifelong Object Segmentation from Change Detection in Dense RGB-D maps." 2013 European Conference on Mobile Robots, IEEE. Sep. 25, 2013. pp. 178-185.

\* cited by examiner

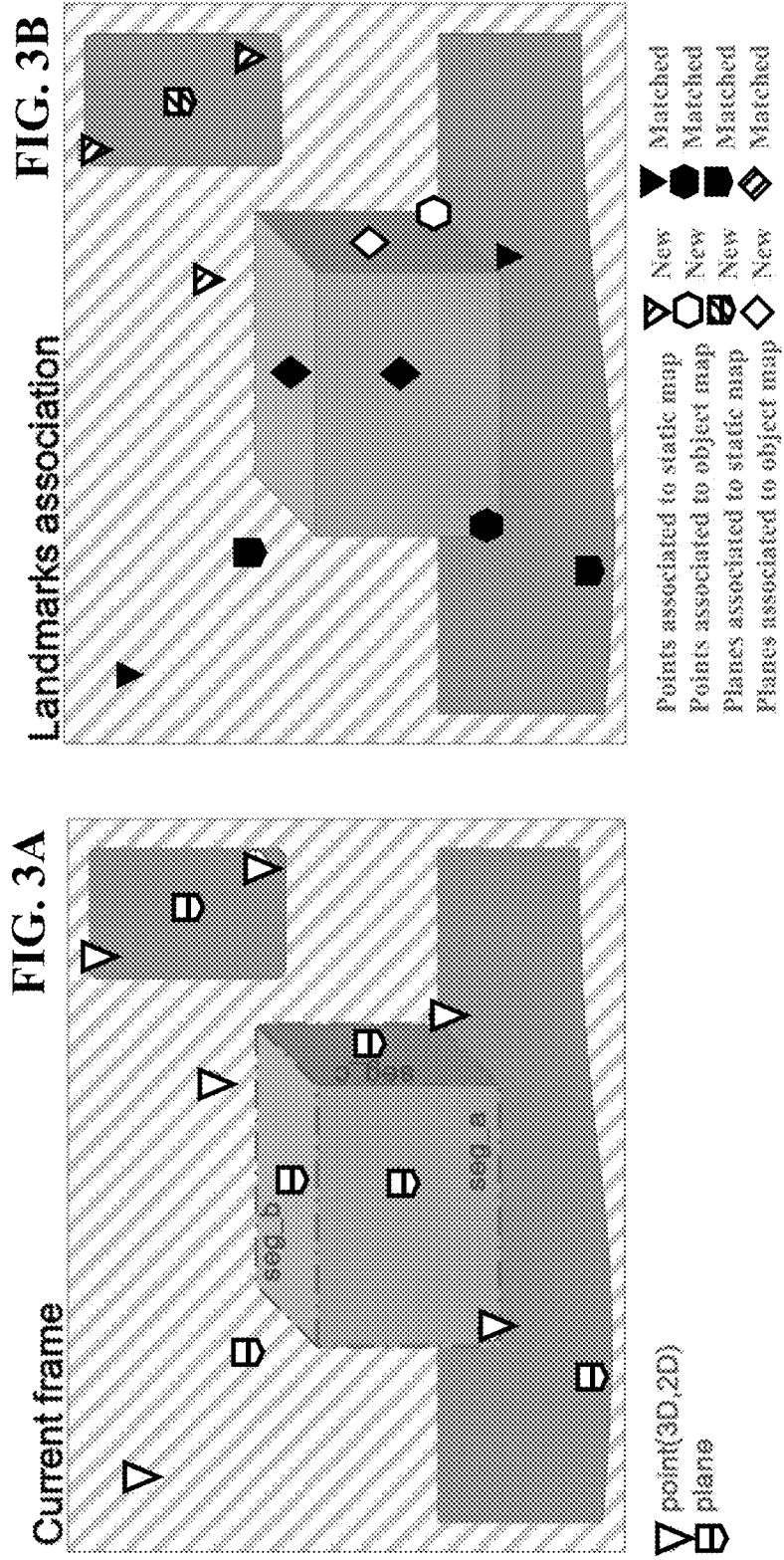

METHOD AND SYSTEM FOR CONCURRENT RECONSTRUCTION OF DYNAMIC AND STATIC OBJECTS

FIELD

The present disclosure relates generally computer vision and image processing, and more particularly to concurrent reconstruction of dynamic and static objects suitable for simultaneous localization and mapping (SLAM) of static objects in a scene and detecting and tracking objects moving in the scene.

BACKGROUND

Conventional robots are challenged in establishing spatial and temporal relationships, stationary objects and moving objects in a scene. Localization is a term regarding a process of establishing spatial relationships between the robot and stationary objects. Mapping is referred as a process of establishing the spatial relationships among stationary objects. Moving object tracking can be understood as a process of establishing the spatial and temporal relationships between moving objects and the robot or between moving and stationary objects. Localization, mapping and moving object tracking are difficult for conventional sensor devices such as a robot, because of uncertainty and unobservable states in the real world. Perception sensors such as cameras, radar and laser, and motion sensors such as odometry and inertial measurement units are noisy making them undesirable for use in today's technological applications for localization and mapping of a scene. For example, the intentions, or control inputs, of the moving objects are unobservable without using extra sensors mounted on the moving objects.

The simultaneous localization and mapping (SLAM) problem and moving object tracking problem have long been challenges in the mobile robotics and artificial intelligence industries. SLAM involves simultaneously estimating locations of newly perceived landmarks and the location of the robot itself while incrementally building a map. Moving object tracking involves both state inference and motion model learning. In conventional applications, SLAM and moving object tracking are considered in isolation, i.e. separately. In the conventional SLAM problem, data associated with stationary objects are positive and data associated with moving objects are negative, which degrades the performance. Conversely, measurements belonging to moving objects are positive in the moving object tracking problem; stationary objects are considered background and filtered out. See, e.g., a method described in U.S. Pat. No. 6,049,619.

Accordingly, there is a need for systems and methods to provide feature-based simultaneous localization and mapping (SLAM) for localization and mapping of a scene that includes both static and dynamic objects to address today's technological applications such as in the mobile robotics and artificial intelligence industries.

SUMMARY

Embodiments of the present disclosure provide systems and methods for computer vision and image processing, and more particularly to concurrent reconstruction of dynamic and static objects suitable for simultaneous localization and mapping (SLAM) of static objects in a scene and detecting and tracking objects moving in the scene.

The present disclosure is based on the realization that our systems and methods provide for simultaneous three-dimensional (3D) reconstruction of static regions and dynamic objects, i.e. rigidly moving objects in a scene. We believed that simultaneous localization and mapping (SLAM) of static and moving objects can be mutually beneficial, because both stationary objects and moving objects are positive information to scene understanding. Specifically, the present disclosure provides a sparse feature-based SLAM system for localization and mapping of a scene including static and dynamic objects. The sparse feature-based SLAM stores only keypoints, i.e., points of interest in the scene, which can reduce the computational and storage burden on a processor running the sparse feature-based SLAM system, among other advantages. Such a sparse feature-based SLAM needs to generate concurrently a static map of one or multiple static objects in the scene and an object map (model) of each dynamic object in the scene. However, coining to this realization proved to be challenging.

The techniques for SLAM with detection and tracking of moving objects (DATMO) aim to solve moving object tracking problem by adaptively learning a motion model for the object. Thus, they decompose the estimation problem into two separate estimators by maintaining separate posteriors for stationary objects and moving objects. As a result, the estimation problems became much lower dimensional than SLAM with generalized objects, which made it feasible to update both filters in real-time.

However, these conventional approaches have significant practical issues to consider. Wherein we found these practical issues limit their application in regard to today's technological applications. For example, these practical issues arise from a number of implicit assumptions in perception modeling and data association, such as, an assumption of a smoothness on the motion of the objects. Some conventional systems have difficulties when the object does not have any smooth motion (i.e., manipulated by a human). We further found in applying solutions to these issues lead us to an increasing cost of hardware and/or computational requirements. Moreover, these approaches do not provide 3D reconstruction of the moving object, instead they only provide object tracking (i.e. the position of the object with respect to the static map). To that end, we needed to overcome the above limitations of the conventional approaches and to find a solution that meets today's technological applications.

There are other conventional SLAM approaches, that assume a model of a moving object is given in advance. These approaches require a separate modeling or object scanning stage prior to SLAM. To that end, in these techniques, the moving object tracking becomes easier since only the moving object pose is maintained and updated, and tracking is performed based on the model. However, the model of the moving object can be unknown, as the types and packaging of the objects can rapidly change such as in a warehouse. Thus, it would not be feasible to generate separate object map for each coining new object, which would make these conventional approaches hard to use in real life.

Using dense SLAM systems can make dynamic object detection easier, as it uses all information of the scene in its dense representation. However, using the dense SLAM system resulted in being computationally demanding compared to sparse systems. The dense SLAM approaches store all intensity and depth information found in the input frame. Whereas for the sparse feature-based SLAM approach, stores only keypoints, i.e., points of interest in the scene, which reduces the computational and storage burden on a processor running the sparse feature-based SLAM system, as noted above. At least one reason using the sparse feature-based SLAM approach is important, by non-limiting example, is because using the sparse approach in a robot is beneficial because a simple processor can be used and won't fail due to the large amounts of data. Whereas, for dense systems are computationally demanding, and will only work on a graphics processing unit (GPU).

Some embodiments of the present disclosure first start with a single map and localize each frame with respect to this map, referred to as a static map. A moving object can be detected as the set of segments that has high outlier ratio after frame localization with respect to the static map. After detecting the features that fall inside dynamic segment measurements, we initialize a new map to represent the rigidly moving object, i.e. dynamic object, referred to as an object map. In the following observations, each frame is registered with respect to both the static and object maps. Wherein we distinguish the features belonging to the objects and static region based on the inliers resulting from these registrations.

The present disclosure is based on a multi-stage geometric verification approach that is used to discriminate features coining from dynamic and static regions. Specifically, we use feature grouping for object representation. Wherein in the SLAM framework of the present disclosure, the keyframes are treated as a collection of features and objects are seen as a collection of segments, that are subset of features from the keyframe. Such that the multi-stage registration scheme considers registration of all features and various subsets of features of the frame against each map. First, all measurements are registered against the static map, which will result in finding the dominating motion pattern in the frame, while localization of small moving objects can be missed. Then, in a second stage, we proceed with a segment-based registration procedure, where we register the features falling inside a segment against the object map. Since classification of features depends on registration, the need for accurate pose estimates and performing geometric verification in multiple stages, yields for a more robust registration.

At least one important advantage of the present disclosure is an on-the-fly generation of object models, while mapping static environment at the same time. Just like a child learns to model and manipulate objects by watching others, the present disclosure learns both object model and static scene map at the same time based on the motion of the object.

At least one method of the present disclosure is an imaging system for localization and mapping of a scene that includes static and dynamic objects. The method includes a sensor to acquire a sequence of frames. Wherein each frame includes a collection of features that are 3D planes and points according to the present disclosure. These features are defined as measurements of the frame. Planes are extracted following a region growing approach on the point cloud and then they are represented with the plane equation. Points are extracted as keypoints represented by intensity and depth measurements of the scene. Keypoints exhibit themselves as distinctive features that help to distinguish one of them from others. For example, the keypoints can be detected with a detector such as scale-invariant feature transform (SIFT) and MSER (maximally stable extremal regions). Wherein each keypoint intensity and depth measurements of the scene can be used for computing descriptors of the keypoints, wherein SIFT and MSER methods can be used for descriptor extraction. Each keypoint is considered as a measurement of the frame, which is represented with the 3D location and descriptor of the associated keypoint. The imaging system includes memory to store a static map of one or multiple static objects in the scene, for example, static objects may include walls and floor in an indoor scene. Further, the memory can also store an object map of each dynamic object in the scene, wherein the static map includes a set of landmarks. A landmark is a specific point in the world, that is represented as a collection of measurements coining from different frames. In other words, the landmark in the map can be viewed by multiple frames from various viewpoints. At least one example of a dynamic object may include everyday objects such as cups and boxes that are manipulated by a human. Further, the memory includes the object map including a set of segments, such that a descriptor of each segment is a function of multiple measurements forming the segment. Here, the set of segments are understood as spatially coherent regions, such as sides of a box, table top or surface of a sphere or cylinder. Also, the descriptor of each segment can be defined as the aggregation of keypoint descriptors that fall inside that segment, wherein Vector of Locally Aggregated Descriptors (VLAD) can be used as a method.

Further, a localizer of the imaging system is used to register at least some measurements of the frame acquired by the sensor with landmarks in the static map by using a frame-based registration. The localizer also registers at least some segments in the frame with segments in the object map using a segment-based registration. Wherein the frame-based registration can be explained as first matching all measurements found in the frame with the landmarks in the map and second finding a transformation between matching pairs following a random sample consensus (RANSAC) framework. Further, the segment-based registration is defined as first matching the segment in the frame with the segments in the map using an appearance similarity search (i.e. VLAD), second matching the measurements of the segment with the landmarks of matching segment from the map and third finding a transformation between matching pairs following a RANSAC framework. Since there might be noise in matching process, RANSAC procedure outputs which matches are considered correct based on the computed transformation. Thus, it provides correspondences between measurements of the frame and the landmarks of the map.

Finally, a mapper is used to update each object map with measurements forming each segment and measurements registered with the corresponding object map according to the segment-based registration, and updates the static map with the remaining keypoints in the frame using the keypoints registered with the static map. To better understand the mapper, the mapper first determines whether a measurement will be added to the static map or object map and second it updates each map based on that. More specifically, at the first step, a measurement is associated to the object map if it falls inside a segment that is matched with the segments of the object map or if it is found as corresponding to a landmark of the object map. Otherwise, the keypoint is associated to the static map. Next, map is updated with all the keypoints associated with it as a result of the first step. During map update, if the measurement is associated with a landmark of the map, then the measurement is appended to the matching landmark, otherwise the measurement is added to the map as a new landmark. Hence, this procedure enriches existing landmarks and also adds new landmarks to the map.

Another method of the present disclosure can include first initializing the static map with the first input frame and capture another RGB-D frame, i.e. a red, green, blue, and depth (RGB-D) image acquired by the 3D sensor. At the next step, the localization module performs a multi-stage registration between the current input frame and each of the existing maps. If no object maps are initialized yet, the moving object detection module finds the regions that belong to the object. If there are already existing object maps, then we first perform feature classification and split the measurements associated to the existing object maps. Wherein, for the rest of the measurements, we run moving object detection again in order to find if there are new objects in the scene. Depending on the estimated pose of the frame with respect to each map, the frame is added as a novel keyframe to the respective map. Then, a bundle adjustment procedure runs asynchronously with SLAM.

It is possible the present disclosure imaging systems and method can be used for many different technological industries, such as simultaneous robot navigation and object modeling, by non-limiting example. Other technological industries may include robotic manipulation via on-the-fly generated object models. Further our sparse feature-based SLAM system of the present disclosure can also provide numerous benefits, by non-limiting example, such as computational efficiency and accurate 3D reconstruction.

According to an embodiment of the present disclosure, an imaging system for localization and mapping of a scene including static and dynamic objects. The imaging system includes a sensor to acquire a sequence of frames, wherein each frame includes a set of keypoints representing intensity and depth measurements of the scene. A memory to store a static map of one or multiple static objects in the scene and an object map of each dynamic object in the scene. Such that the static map includes a set of landmarks, and the object map includes a set of landmarks and a set of segments, wherein a descriptor of each segment is a function of multiple measurements forming the segment. A localizer is used to register at least some keypoints of the frame acquired by the sensor with landmarks in the static map using frame-based registration and to register at least some segments in the frame with segments in the object map using a segment-based registration. A mapper to update each object map with keypoints forming each segment and keypoints registered with the corresponding object map according to the segment-based registration, and to update the static map with the remaining keypoints in the frame using the keypoints registered with the static map.

According to an embodiment of the present disclosure, an imaging system for localization and mapping of a scene including static and dynamic objects. Wherein a sensor acquires sensor data. The data includes a sequence of frames and each frame includes a set of keypoints representing intensity and depth measurements of the scene. A memory stores a static map of one or multiple static objects in the scene and an object map of each dynamic object in the scene. Wherein the static map includes a set of landmarks. Wherein the object map includes a set of segments, such that a descriptor of each segment is a function of multiple measurements forming the segment. The imaging system including a processor in communication with the memory and the sensor, is configured to employ a localizer to register at least some keypoints of the frame acquired by the sensor with landmarks in the static map using frame-based registration and to register at least some segments in the frame with segments in the object map using a segment-based registration. Wherein the landmarks correspond to specific discriminative points on an object in the scene. A mapper to update each object map with keypoints forming each segment and keypoints registered with the corresponding object map according to the segment-based registration, and to update the static map with the remaining keypoints in the frame using the keypoints registered with the static map.

According to an embodiment of the present disclosure, an imaging system for localization and mapping of a scene including static and dynamic objects. The imaging system including a sensor to acquire a sequence of frames, wherein each frame includes a set of keypoints representing intensity and depth measurements of the scene. A memory to store a static map of one or multiple static objects in the scene and an object map of each dynamic object in the scene. Wherein the static map includes a set of landmarks. Wherein the object map includes a set of segments, such that a descriptor of each segment is a function of multiple measurements forming the segment. A processor in communication with the sensor and memory, is configured to employ a localizer to register at least some keypoints of the frame acquired by the sensor with landmarks in the static map using frame-based registration and to register at least some segments in the frame with segments in the object map using a segment-based registration. A mapper to update each object map with keypoints forming each segment and keypoints registered with the corresponding object map according to the segment-based registration, and to update the static map with the remaining keypoints in the frame using the keypoints registered with the static map.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIGS. 3A, 3B, 3C, 3D, 3E and 3F are schematics illustrating the classification of features into static and object regions, according to embodiments of the present disclosure;

Figure 1A:
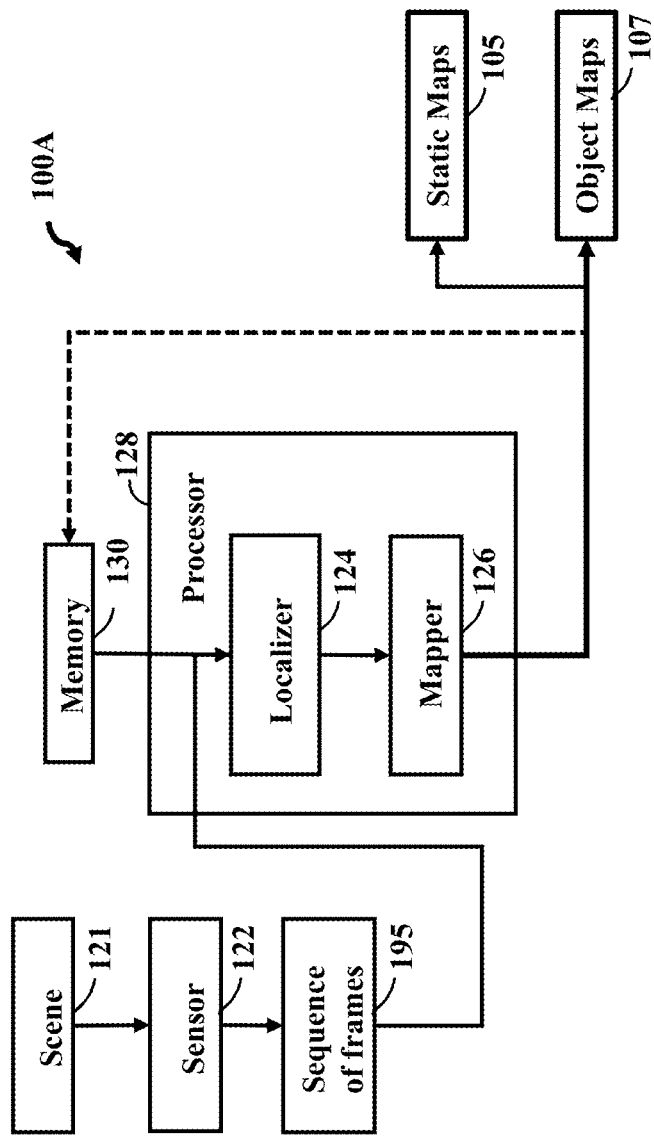
FIG. 1A is a block diagram of the imaging system, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of the present disclosure provide for systems and methods for concurrent reconstruction of dynamic and static objects suitable for simultaneous localization and mapping (SLAM) of static objects in a scene and detecting and tracking objects moving in the scene The present disclosure is based on the realization that our systems and methods provide for simultaneous three-dimensional (3D) reconstruction of static regions and dynamic objects, i.e. rigidly moving objects in a scene. The present disclosure is based on understanding that simultaneous localization and mapping (SLAM) and moving object tracking can be mutually beneficial, because both stationary objects and moving objects are positive information to scene understanding. Specifically, the present disclosure provides a sparse feature-based SLAM system for localization and mapping of a scene including static and dynamic objects. The sparse feature-based SLAM includes keypoints, i.e., points of interest in the scene, which can reduce the computational and storage burden on a processor running the sparse feature-based SLAM system, among other advantages. Such a sparse feature-based SLAM needs to generate concurrently a static map of one or multiple static objects in the scene and an object map (model) of each dynamic object in the scene.

Some embodiments of the present disclosure first start with a single map and localize each frame with respect to this map, referred to as a static map. A moving object can be detected as the set of segments that has high outlier ratio after frame localization with respect to the static map. After detecting the features that fall inside dynamic segment measurements, we initialize a new map to represent the rigidly moving object, i.e. dynamic object, referred to as an object map. In the following observations, each frame is registered with respect to both the static and object maps. Wherein we distinguish the features belonging to the objects and static region based on the inliers resulting from these registrations.

The present disclosure is based on a multi-stage geometric verification approach that is used to discriminate features coining from dynamic and static regions. Specifically, we use feature grouping for object representation. Wherein in the SLAM framework of the present disclosure, the keyframes are treated as a collection of features and objects are seen as a collection of segments, that are subset of features from the keyframe. Such that the multi-stage registration scheme considers registration of all features and various subsets of features of the frame against each map. First, all measurements are registered against the static map, which will result in finding the dominating motion pattern in the frame, while localization of small moving objects can be missed. Then, in a second stage, we proceed with a segment-based registration procedure, where we register the features falling inside a segment against the object map. Since classification of features depends on registration, the need for accurate pose estimates and performing geometric verification in multiple stages, yields for a more robust registration.

At least one important advantage of the present disclosure is an on-the-fly generation of object models, while mapping static environment at the same time. Just like a child learns to model and manipulate objects by watching others, the present disclosure learns both object model and static scene map at the same time based on the motion of the object.

An embodiment of the present disclosure includes a sensor to acquire a sequence of frames, wherein each frame includes a set of keypoints representing intensity and depth measurements of the scene. A memory to store a static map of one or multiple static objects in the scene and an object map of each dynamic object in the scene. Such that the static map includes a set of landmarks, and the object map includes a set of landmarks and a set of segments, wherein a descriptor of each segment is a function of multiple measurements forming the segment. A localizer is used to register at least some keypoints of the frame acquired by the sensor with landmarks in the static map using frame-based registration and to register at least some segments in the frame with segments in the object map using a segment-based registration. A mapper to update each object map with keypoints forming each segment and keypoints registered with the corresponding object map according to the segment-based registration, and to update the static map with the remaining keypoints in the frame using the keypoints registered with the static map.

FIG. 1A is a block diagram of an imaging system according to an embodiment of the present disclosure. The imaging system 100A includes a sensor 122 that acquires a sequence of frames 195 of a scene 121. Wherein each frame includes a set of keypoints representing intensity and depth measurements of the scene 121. A memory 130 to store a static map 105 of one or multiple static objects in the scene 121 and an object map 107 of each dynamic object in the scene. Wherein the static map 105 includes a set of landmarks, and the object map 107 includes a set of segments, such that a descriptor of each segment is a function of multiple measurements forming the segment. A localizer 124 to register at least some keypoints of the frame acquired by the sensor 122 with landmarks in the static map 105 using frame-based registration and to register at least some segments in the frame with segments in the object map 107 using a segment-based registration. A mapper 128 to update each object map 107 with keypoints forming each segment and keypoints registered with the corresponding object map 107 according to the segment-based registration, and to update the static map 105 with the remaining keypoints in the frame using the keypoints registered with the static map 105.

Figure 1B:
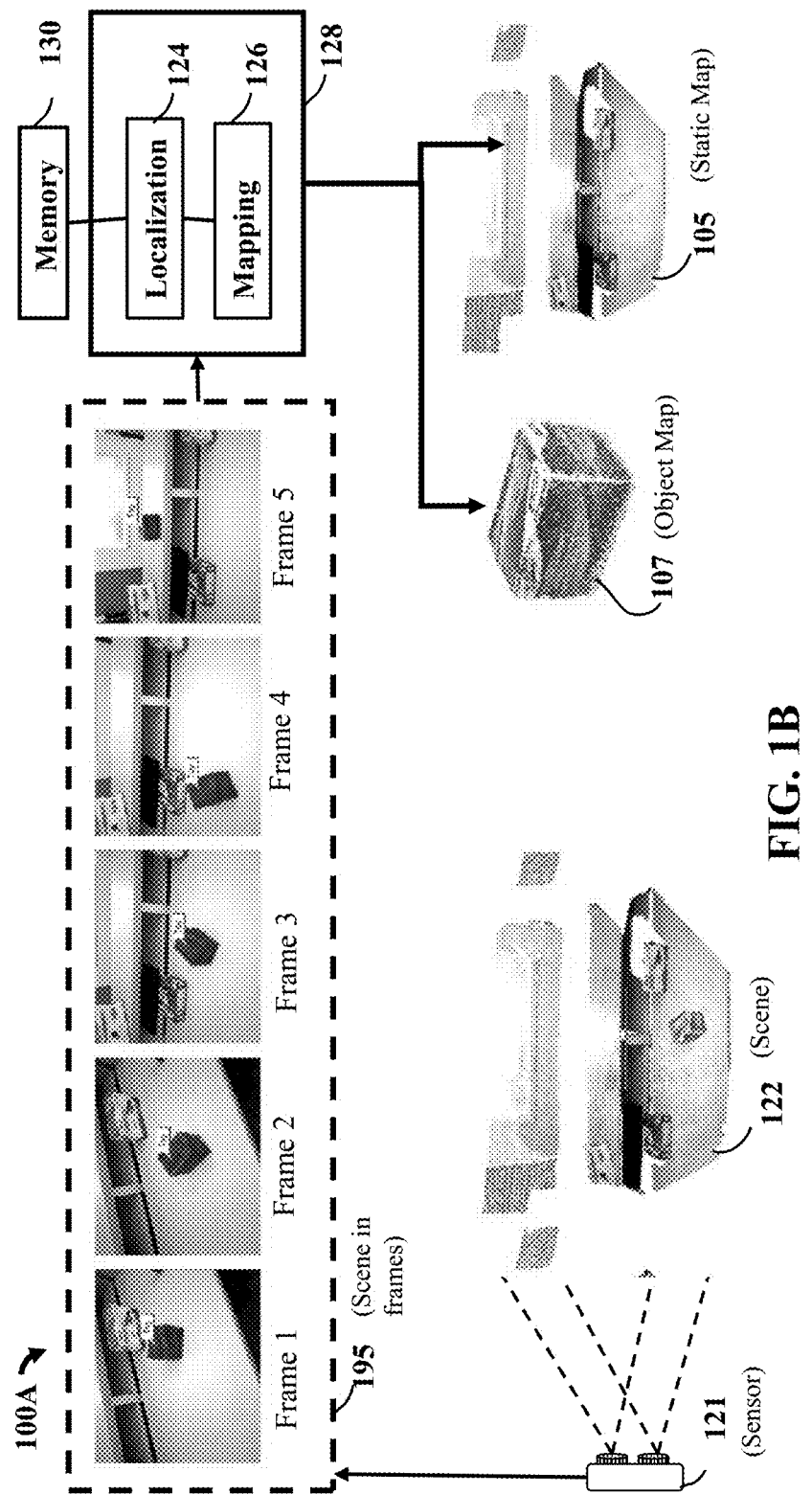
FIG. 1B is a block diagram of the imaging system of FIG. 1A that includes the scene in a sequence of frames, according to an embodiment of the present disclosure.

FIG. 1B is a block diagram of the imaging system of FIG. 1A that includes the scene in a sequence of frames, according to an embodiment of the present disclosure. FIG. 1B illustrates a sequence of frames 195 captured from the scene 122 by sensor 121. The sequence of frames 195 are inputted into the processor 128 to be processed by the localization 124 and mapping 126 system, which is in communication with memory 130. The system 100A can successfully distinguish features coining from static regions and dynamic object of the scene 122, and then can output static maps 105 and object mats 107, respectively.

Figure 1C:
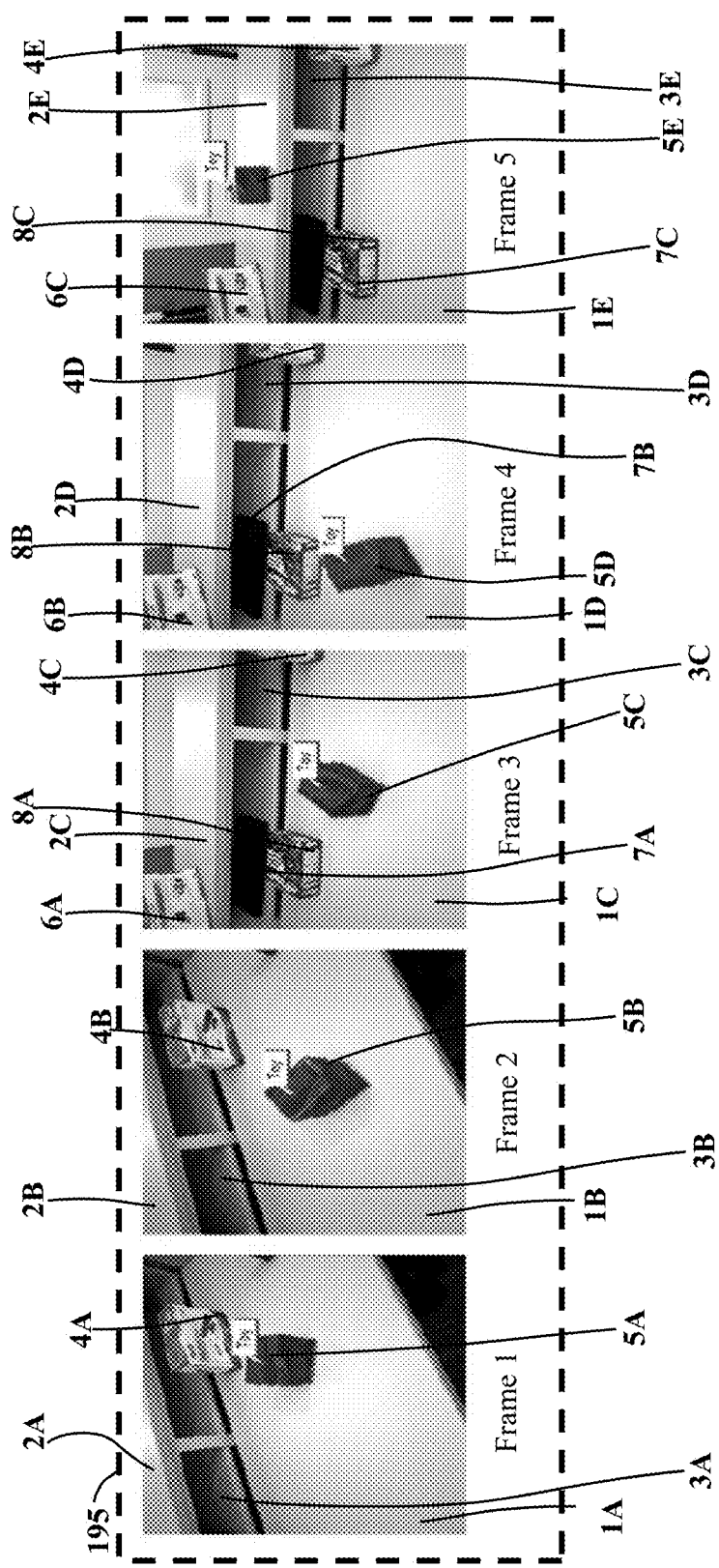
FIG. 1C illustrates the sequence of frames of the scene in the block diagram of the imaging system of FIG. 1B, according to embodiments of the present disclosure.

FIG. 1C illustrates the sequence of frames of the scene in the block diagram of the imaging system of FIG. 1B, according to the present disclosure. Referring to FIGS. 1B and 1C, each frame shows objects in the scene 122, wherein some of the objects can be used to obtain a collection of features (i.e. 3D planes and points) used to define measurements of the frame. For example, frames 1-2 include some objects such as a surface of a table 1A,1B a surface of a top shelf 2A,2B a surface of a bottom shelf 3A,3B a first box 4A,4B and a toy 5A,5B, wherein the first box 4A,4B is approximate the toy 5A,5B. Frames 3-5 includes the same objects of frames 1-2, along with a second box 6A,6B,6C located on the surface of the top shelf 2C,2D,2E, a third box 7A,7B,7C located on the surface of the table 1C,1D,1E, and a fourth box 8A,8B,8C located on the surface of the bottom shelf 3C,3D,3E. In these frames the toy 5A-E is moving and the sensor of FIG. 1B is moving or may be moving. The system correctly identified the segments that belong to the toy 5A-E as indicated with blue overlay. Object motion is abrupt especially between frame 4 and frame 5, where the toy 5D is on the table and moved to the surface of the top shelf 2E afterwards.

As noted above, planes are extracted following a region growing approach on the point cloud and then they are represented with the plane equation. Points are extracted as keypoints represented by intensity and depth measurements of the scene. The keypoints exhibit themselves as distinctive features that help to distinguish one of them from others. Wherein each keypoint intensity and depth measurements of the scene can be used for computing descriptors of the keypoints, wherein SIFT and MSER methods can be used for descriptor extraction. Each keypoint is considered as a measurement of the frame, which is represented with the 3D location and descriptor of the associated keypoint. The imaging system 100A includes memory 130 to store a static map 105 of one or multiple static objects in the scene 122.

Still referring to FIGS. 1B and 1C, for example, the one or more multiple static objects in the scene 122 of the stored static map 105 may include, by non-limiting example, the surface of the table 1A-E, structural aspects of the shelf (i.e. the surface of the top shelf 2A-2E, the surface of the bottom shelf 3A-3E, etc.), the first box 4A-4E, the second box 6A-6C, the third box 7A-7C and the fourth box 8A-8C. Wherein the static map 105 includes a set of landmarks. A landmark is a specific point in the world, that is represented as a collection of measurements coining from different frames. In other words, the landmark in the static map 105 can be viewed by multiple frames from various viewpoints.

The memory 130 can also store an object map 107 of each dynamic object in the scene 122, at least one example of a dynamic object may include the toy 5A-5E. Further, the memory 130 includes the object map 107 having a set of segments, such that a descriptor of each segment is a function of multiple measurements forming the segment. Here, the set of segments are understood as spatially coherent regions, such as, by non-limiting example, structural aspects of the table (i.e. the surface of the table 1A-E, etc.), structural aspects of the shelf (i.e. the surface of the top shelf 2A-2E, the surface of the bottom shelf 3A-3E, etc.), structural aspects of the first box 4A-4E, structural aspects of the second box 6A-6C, structural aspects of the third box 7A-7C and structural aspects of the fourth box 8A-8C. Also, the descriptor of each segment can be defined as the aggregation of keypoint descriptors that fall inside that segment, wherein Vector of Locally Aggregated Descriptors (VLAD) can be used as a method.

Figure 1D:
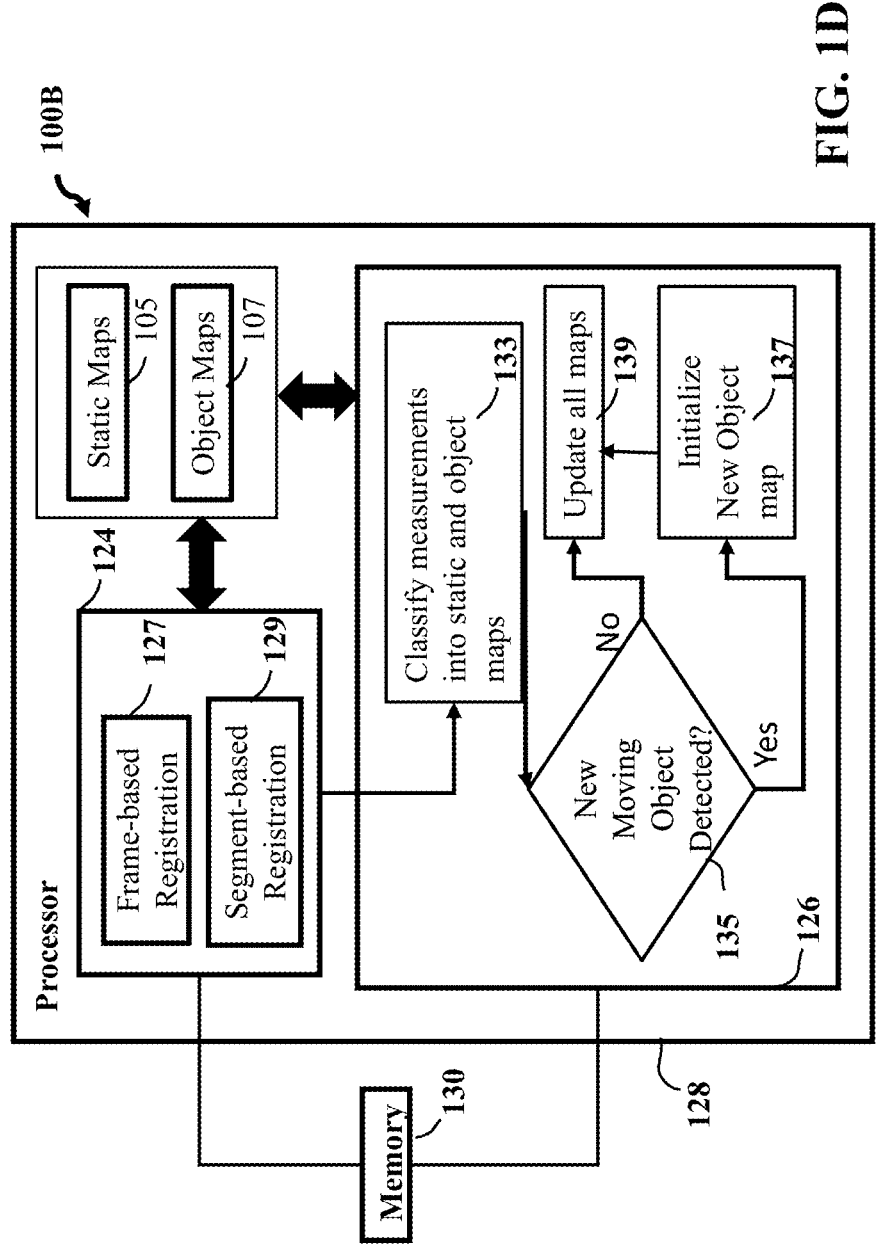
FIG. 1D shows a block diagram of an imaging system 100B detailing aspects of the localizer and mapper modules of the imaging system, according to embodiments of the present disclosure.

FIG. 1D shows a block diagram of an imaging system 100B detailing aspects of the localizer and mapper modules of the imaging system, according to embodiments of the present disclosure. Localizer 124 can be composed of steps a frame-based step 127 and a segment-based registration step 129. For example, the localizer can be used to register at least some measurements of the frame acquired by the sensor with landmarks in the static map by using the frame-based registration 127. The localizer also registers at least some segments in the frame with segments in the object map using a segment-based registration 129. Wherein the frame-based registration 127 can be explained as first matching all measurements found in the frame with the landmarks in the map, and second finding a transformation between matching pairs following a random sample consensus (RANSAC) framework. Further, the segment-based registration 129 can be defined as first matching the segment in the frame with the segments in the map using an appearance similarity search (i.e. VLAD), second matching the measurements of the segment with the landmarks of matching segment from the map, and third finding a transformation between matching pairs following a RANSAC framework. Since there might be noise in matching process, RANSAC procedure outputs which matches are considered correct based on the computed transformation. Thus, it provides correspondences between measurements of the frame and the landmarks of the map.

Still referring to FIG. 1D, next the mapper 126 can use the output of localizer 124 to first classify the measurements 133 into static and dynamic regions. The next step can include detecting for new moving objects 135. Wherein for features that are not associated to any map, the localizer 124 searches for new moving objects based on the number of outliers with the static map 105 per segment. If new moving objects are found (yes) 137, new object maps 107 are initialized. Lastly, the step for map update 139 is performed in order to update all the maps based on the measurement classification and new object detection results.

In other words, the mapper 126 first determines whether a measurement will be added to the static map 105 or object map 107, and second, the mapper 126 updates each map based on that. More specifically, at the first step, a measurement is associated to the object map 107 if it falls inside a segment that is matched with the segments of the object map, or if it is found as corresponding to a landmark of the object map. Otherwise, the keypoint is associated to the static map 105. Next, each map is updated with all the keypoints associated with it as a result of the first step. During the map update, if the measurement is associated with a landmark of the map, then the measurement is appended to the matching landmark, otherwise the measurement is added to the map as a new landmark. Hence, this procedure improves existing landmarks and also adds new landmarks to the map.

Figure 2:
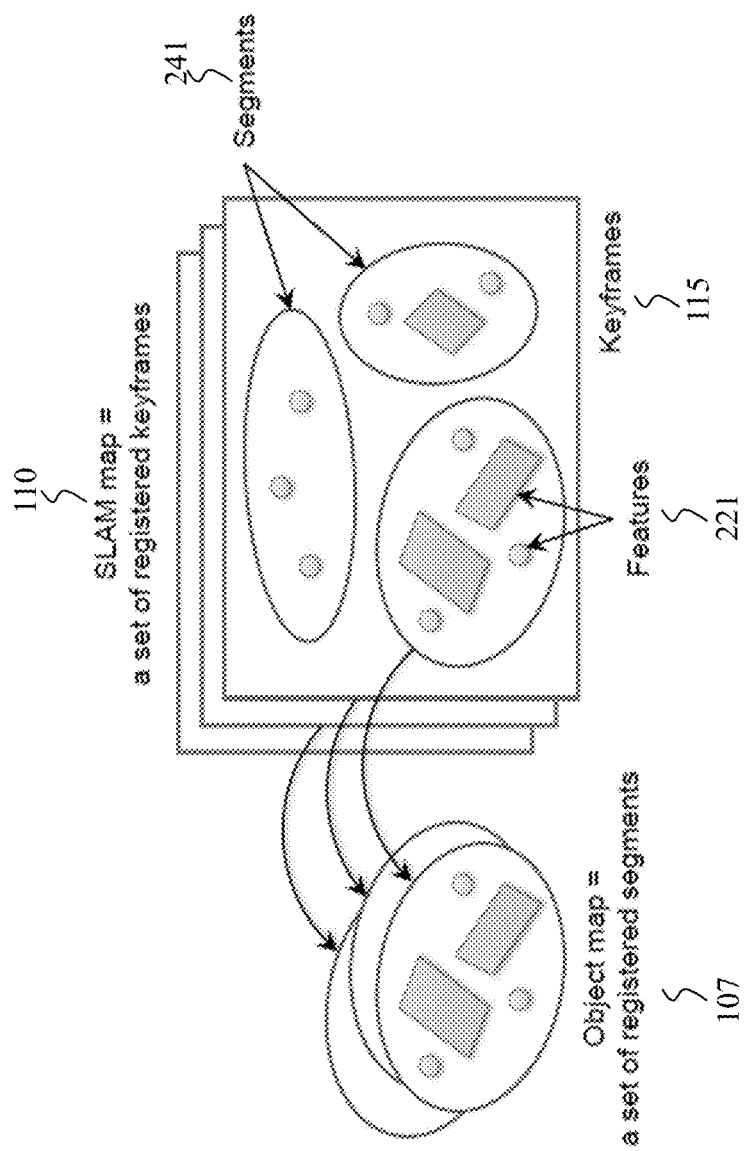
FIG. 2 is a schematic of hierarchical feature grouping using object and SLAM maps, according to embodiments of the present disclosure.

FIG. 2A is a schematic of hierarchical feature grouping using object and SLAM maps, according to embodiments of the present disclosure. Specifically, FIG. 2A illustrates a feature grouping approach for generating segments, according to embodiments of the present disclosure. A SLAM map 110 stores a set of registered keyframes 115, each associated with a set of features 221. Wherein the present disclosure uses another hierarchy based on segments 241 to represent an object. A segment contains a subset of features 221 in a keyframe, and an object map 107 includes a set of registered segments. In our system, the segments can be generated by depth-based segmentation.

Figures 3C, 3D:
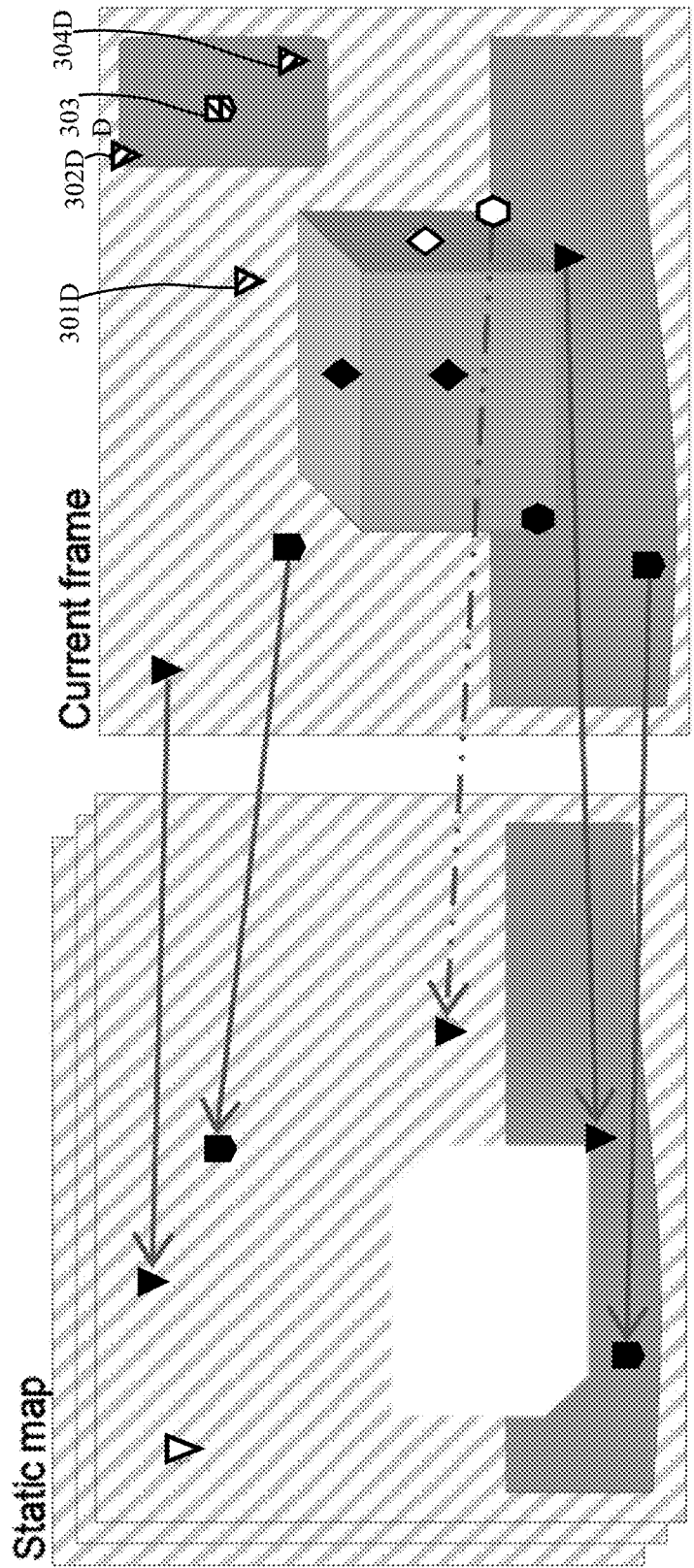
Figures 3E, 3F:
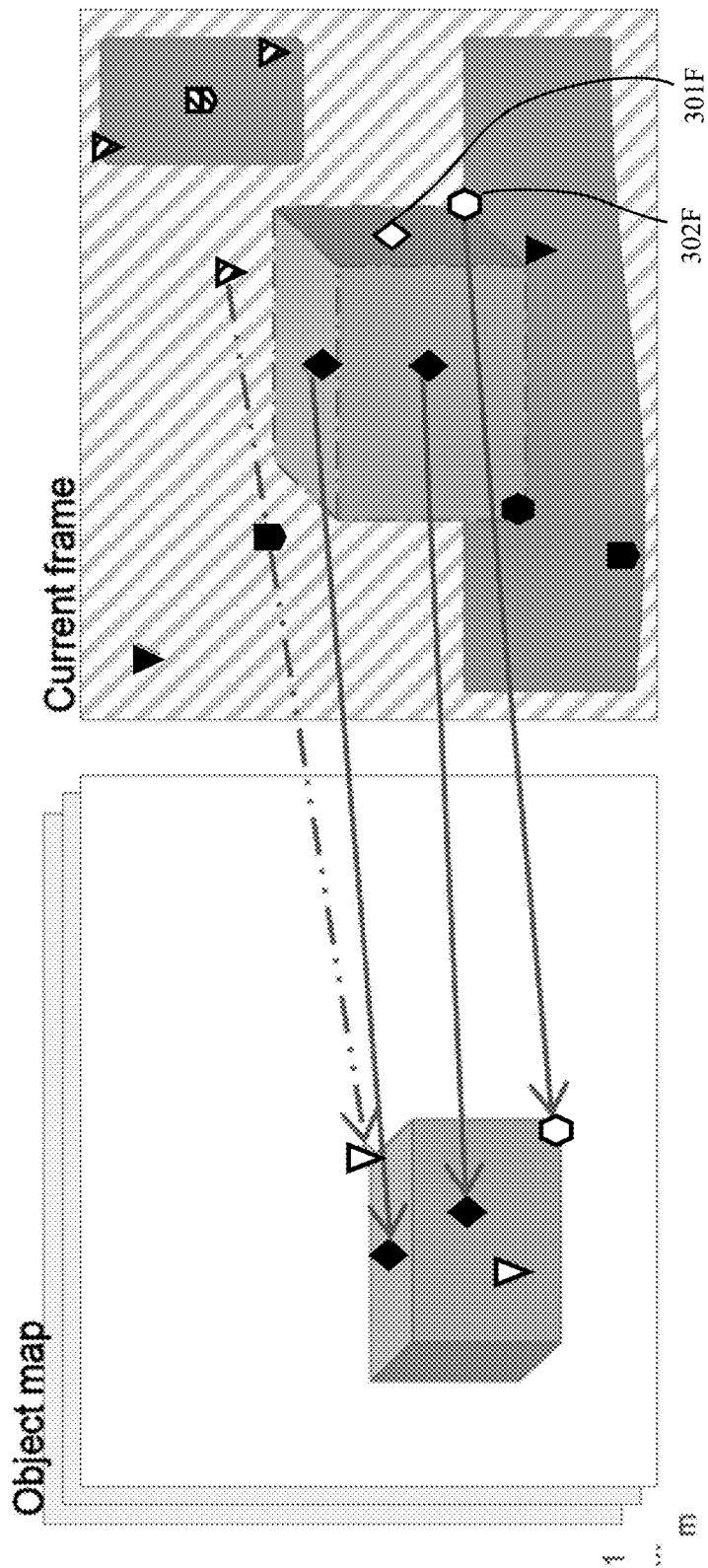

FIGS. 3A-3F are schematics illustrating the classification of features into static and object regions, according to the present disclosure. Features are extracted from the current frames as shown in FIG. 3A, where features consist of planes, 3D points and 2D points. Segments are generated at the sides of the box, that are named seg_a, seg_b and seg_c. Feature classification provides the association of the features between the frame and map landmarks as seen in FIG. 3B. The segments seg_a, seg_b and seg_c are found as matching segments to the object map. The features, that are associated to the landmarks of the static map are added to the static map as shown in FIGS. 3C and 3D. Solid lines illustrate the features that are appended to the already existing corresponding landmarks in the static map. Dashed line indicates a match of the feature to both static and the object maps, where the mapper decided in favor of the object map and added the feature to the object map since the feature is inside a segment that is matched to the object map. Features that are not matched to any landmarks, but found as associated to the static map 301D, 302D, 303D, 304D are added as new landmarks to the static map in FIG. 3D. FIGS. 3E and 3F show map update for the object map. Matching features are added to the corresponding landmarks of the object map as shown with the solid lines. The dashed line indicates a wrong match between the frame and the object map, where the feature correctly added to the static map as it is found to be outside the matching segments. Features that are not matched to existing landmarks, but found to be associated to the object map 301F, 302F are added to the object map as new landmarks as shown in FIG. 3F.

The present disclosure incorporates an algorithm for measurement classification performed by the mapper. For example, algorithm 1 includes a measurement in the frame that is denoted as m. $I_{static}$ and $I_{object}$ denote the indicator function whether the measurement is found as associated to static and object maps respectively as a result of the localizer. $S_{object}(m)$ indicates whether the measurement is inside a matching segment. The measurement in is added to the object map if it is inside a matching segment or if it is found as associated to the object map. Otherwise, it is added to the static map. Algorithm 1 is disclosed as:

---
Algorithm 1 Measurements association

1: for $\forall m \in$ measurements of frame do
2:    if $S_{object}(m)$ then
3:        m belongs to the object map
4:    else
5:        if $I_{object}(m)$ then
6:            m belongs to the object map
7:        else
8:            m belongs to the static map
9:        end if
10:   end if
11: end for

---

Figure 4A:
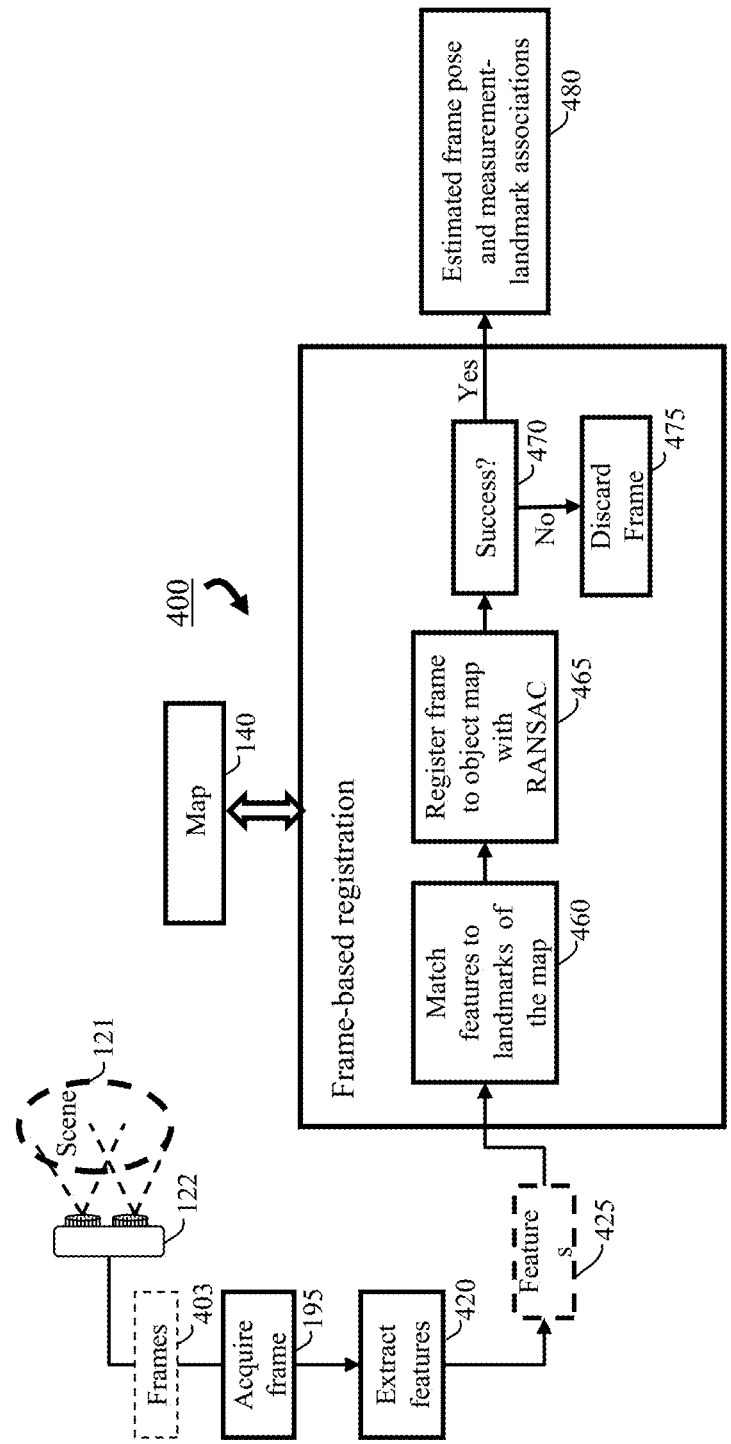
FIG. 4A is a block diagram of the frame-based registration of the imaging system, according to embodiments of the present disclosure.

FIG. 4A is a block diagram of the frame-based registration of the imaging system, according to embodiments of the present disclosure. The sensor 122 captures a frame of the scene 121 and the process uses the features 425 extracted from the acquired frame 403. Frame-based registration 400 consists of two stages. First, the features are matched 460 with the landmarks of the map. Second, the matches are exploited in a RANSAC framework 465 to register frame to the object map. If RANSAC succeeds 470, then the registration yields estimated pose and measurement-landmark associations 480. Otherwise the frame is discarded 475. Note that, the matches provided in the first stage can be noisy and RANSAC procedure can determine wrong matches providing accurate measurement-landmark association 480 between frame 403 and the map 140 as a result.

Figure 4B:
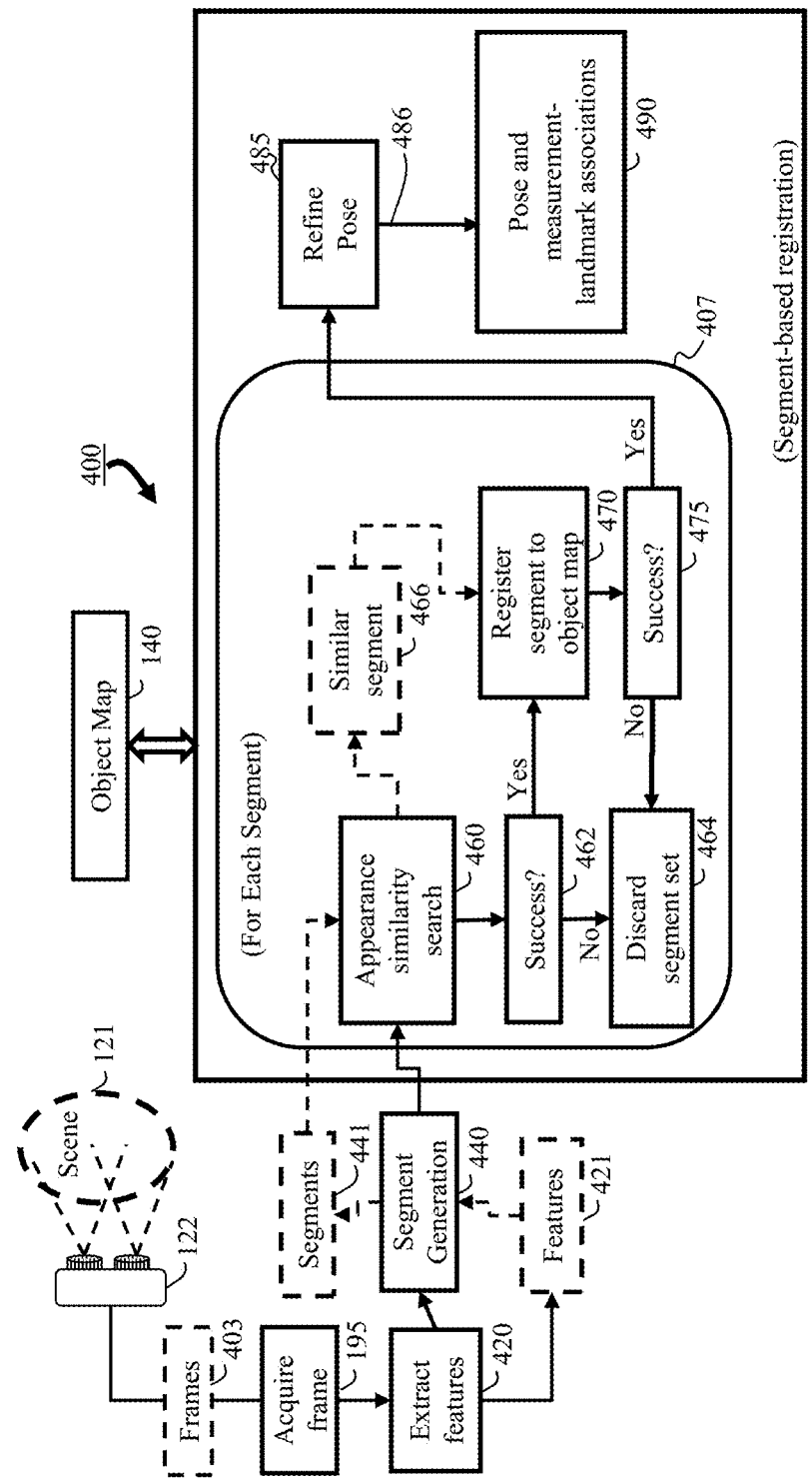
FIG. 4B is a block diagram of the segment-based registration of the imaging system, according to embodiments of the present disclosure.

FIG. 4B is a block diagram of the segment-based registration of the imaging system of FIG. 4A, according to embodiments of the present disclosure. The sensor 122 captures a frame 403 of the scene 121 and the process uses the features 421 and segments 441 extracted from the acquired frame 403. For each segment, the system first performs an appearance similarity search 460 against the segments in the object map 140. If there are matching segments 466, it follows with a geometric verification where the frame segments are registered 470 with matching segment of the object map following a RANSAC framework. If RANSAC succeeds 475, then the resulting pose is considered a prediction and it is refined 485 by a prediction-based localization procedure. More specifically, all landmarks of the object map 140 are matched against all the features 421 of the frame 403 based on the predicted pose and localized following RANSAC. This refinement 485, ensures all landmarks of the map 140 and all features of the frame 403 are considered during localization. Finally, segment-based registration outputs the computed pose and measurement-landmark associations 490.

Features

Aspects of the imaging system of the present disclosures can include the localizer is configured to extract features from the frame, segment the frame into multiple segments, wherein each segment includes multiple features extracted from the frame, search the object map for segments similar to the segments in the frame; and register a segment in the frame with a matching segment in the object map. Wherein the search can be based on a vector of locally aggregated descriptors (VLAD). Wherein the frame is segmented with a depth-based segmentation. Wherein the features can be associated with descriptors. Wherein the landmarks correspond to specific discriminative points on an object in the scene. Wherein wherein the segment is registered using a random sample consensus (RANSAC). Wherein the search is an appearance-based similarity search.

Another aspect of the imaging system of the present disclosure can also include the segment-based registration performs appearance matching of segments in the frame with the segments in the object map and performs a geometric verification between the matching segments. Further, an aspect may include the mapper is configured to add all keypoints of one or more segment to the object map that the segment is registered. An aspect may include the mapper is further configured to add keypoints to the object map based on the localization, if the keypoints have a correspondence with the landmarks of the object map, if not, add the keypoints to the static map.

Another aspect may include a manipulator including a robot arm for manipulating the dynamic object based on the object map. Further still, the sensor can be from the group consisting one of a three dimensional (3D) sensor capable of acquiring a red color, a green color, a blue color, and a depth (RGB-D) image data, or other sensors capable of acquiring image data that is composed of intensity and depth.

Figure 5:
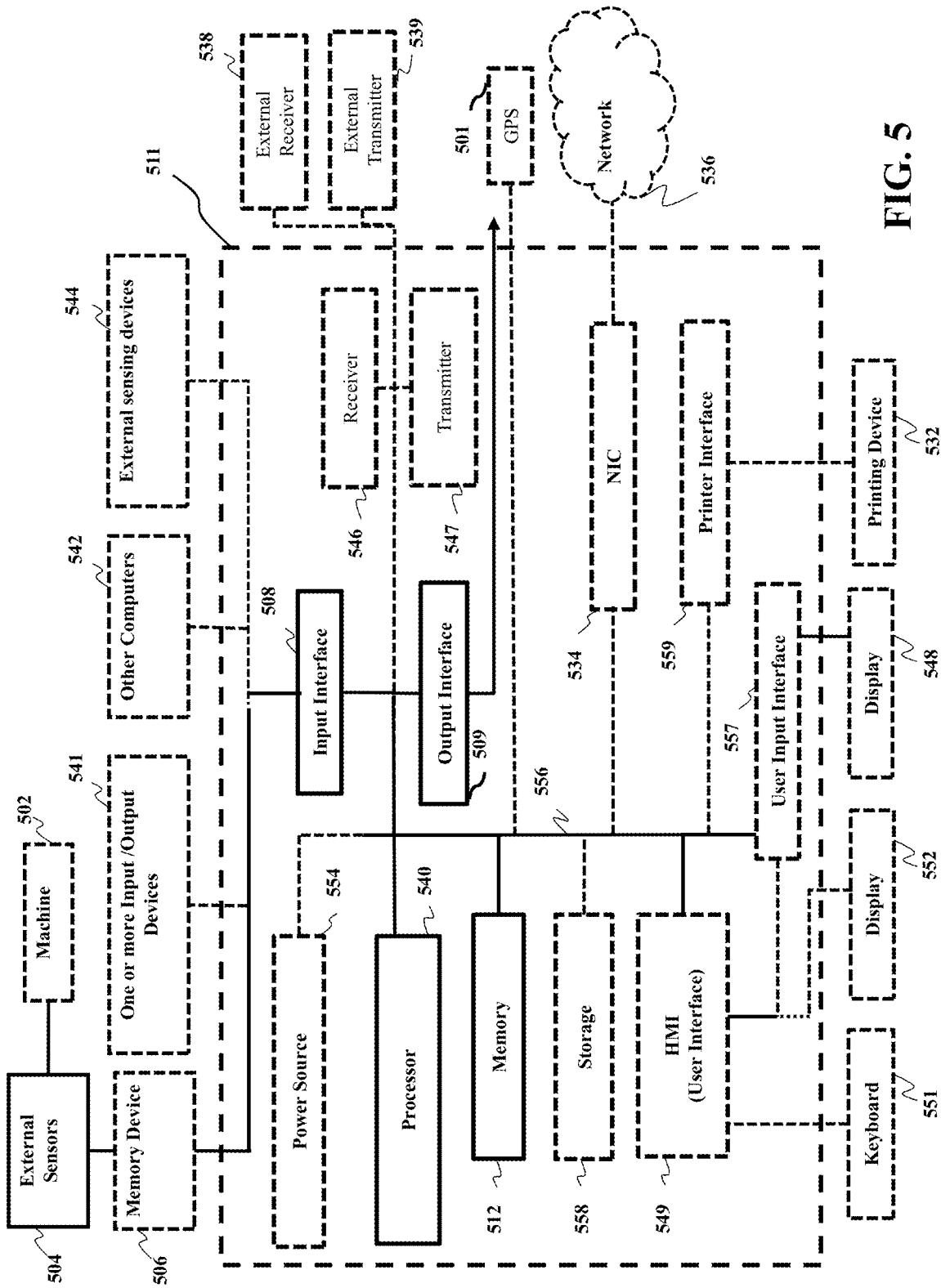
FIG. 5 is a block diagram of illustrating the method of FIG. 1A, that can be implemented using an alternate computer or controller, according to embodiments of the present disclosure.

FIG. 5 is a block diagram of illustrating the method of FIG. 1A, that can be implemented using an alternate computer or processor, according to embodiments of the present disclosure. The computer 511 includes a processor 540, computer readable memory 512, storage 558 and user interface 549 with display 552 and keyboard 551, which are connected through bus 556. For example, the user interface 549 in communication with the processor 540 and the computer readable memory 512, acquires and stores the measuring data in the computer readable memory 512 upon receiving an input from a surface, keyboard surface, of the user interface 557 by a user.

Contemplated is that the memory 512 can store instructions that are executable by the processor, historical data, and any data to that can be utilized by the methods and systems of the present disclosure. The processor 540 can be a single core processor, a multi-core processor, a computing cluster, or any number of other configurations. The processor 540 can be connected through a bus 556 to one or more input and output devices. The memory 512 can include random access memory (RAM), read only memory (ROM), flash memory, or any other suitable memory systems.

Still referring to FIG. 5, a storage device 558 can be adapted to store supplementary data and/or software modules used by the processor. For example, the storage device 558 can store historical device data and other related device data such as manuals for the devices, wherein the devices are sensing device capable of obtaining measured data as mentioned above regarding the present disclosure. Additionally, or alternatively, the storage device 558 can store historical data similar to the measuring data. The storage device 558 can include a hard drive, an optical drive, a thumb-drive, an array of drives, or any combinations thereof.

The system can be linked through the bus 556 optionally to a display interface (not shown) adapted to connect the system to a display device (not shown), wherein the display device can include a computer monitor, camera, television, projector, or mobile device, among others.

The computer 511 can include a power source 554, depending upon the application the power source 554 may be optionally located outside of the computer 511. Linked through bus 556 can be a user input interface 557 adapted to connect to a display device 548, wherein the display device 548 can include a computer monitor, camera, television, projector, or mobile device, among others. A printer interface 559 can also be connected through bus 556 and adapted to connect to a printing device 532, wherein the printing device 532 can include a liquid inkjet printer, solid ink printer, large-scale commercial printer, thermal printer, UV printer, or dye-sublimation printer, among others. A network interface controller (NIC) 534 is adapted to connect through the bus 556 to a network 536, wherein measuring data or other data, among other things, can be rendered on a third party display device, third party imaging device, and/or third party printing device outside of the computer 511.

Still referring to FIG. 5, the measuring data or other data, among other things, can be transmitted over a communication channel of the network 636, and/or stored within the storage system 558 for storage and/or further processing. Further, the measuring data or other data may be received wirelessly or hard wired from a receiver 546 (or external receiver 538) or transmitted via a transmitter 547 (or external transmitter 539) wirelessly or hard wired, the receiver 546 and transmitter 547 are both connected through the bus 556. The computer 511 may be connected via an input interface 508 to external sensing devices 544 and external input/output devices 541. The computer 511 may be connected to other external computers 542. An output interface 509 may be used to output the processed data from the processor 540.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An imaging system for localization and mapping of a scene including static and dynamic objects, comprising:
   a sensor to acquire a sequence of frames;
   a memory to store a static map of one or multiple static objects in the scene and an object map of each dynamic object in the scene, wherein the static map includes a first set of stored landmarks, and the object map includes a second set of stored landmarks and a set of stored segments, wherein a descriptor of each of the stored set of segments is a function of multiple measurements forming the set of stored segments;

a processor is in communication with the sensor and the memory, and is configured to obtain a set of segments from each frame of the acquired sequence of frames, and register the set of segments from each frame which are observed from different angles by computing of a similarity between newly observed and the set of stored segments, wherein each frame of the acquired sequence of frames includes a set of keypoints representing intensity including color and depth measurements of the scene;

a localizer to register at least some keypoints from the set of keypoints with corresponding landmarks in the stored static map using frame-based registration, and to register at least some segments from the set of segments in each frame of the acquired sequence of frames with segments in the stored object map using a segment-based registration, such that the segment-based registration performs appearance matching of segments in each frame of the acquired sequence of frames with the segments in the object map and geometric verification between matching segments, wherein the set of keypoints does not require hand-crafted point cloud filters because the frame-based registration rejects noise automatically; and a mapper to update each stored object map of each dynamic object in the scene with the at least some registered keypoints forming each segment and keypoints registered with the corresponding stored object map according to the segment-based registration, and to update the stored static map with the remaining keypoints in each frame of the acquired sequence of frames using the keypoints registered with the stored static map, wherein the reconstructed geometry is composed of unaltered intensity and depth measurements of the scene acquired from the sequence of frames.

2. The imaging system of claim 1, wherein the localizer is configured to extract features from each frame of the acquired sequence of frames;

segment each frame of the acquired sequence of frames into multiple segments, wherein each segment includes multiple features extracted from each frame of the acquired sequence of frames;

search the stored dynamic map and the stored static map for matching segments in each frame of the acquired sequence of frames; and register a segment in each frame of the acquired sequence of frames with a matching segment in the stored dynamic map and the stored static map.

3. The imaging system of claim 2, wherein the search is based on a vector of locally aggregated descriptors (VLAD).

4. The imaging system of claim 2, wherein each frame of the acquired sequence of frames is segmented with a depth-based segmentation.

5. The imaging system of claim 2, wherein the features are associated with descriptors.

6. The imaging system of claim 2, wherein the first and the second sets of stored landmarks correspond to discriminative points on an object in the scene.

7. The imaging system of claim 2, wherein the segment is registered using a random sample consensus (RANSAC).

8. The imaging system of claim 2, wherein the search is an appearance-based similarity search.

9. The imaging system of claim 1, wherein the segment-based registration performs appearance matching of segments in each frame of the acquired sequence of frames with the segments in the stored object map and performs a geometric verification between the matching segments.

10. The imaging system of claim 1, wherein the mapper is configured to add all registered keypoints of one or more of the set of segments to the stored object map that the segment is registered.

11. The imaging system of claim 1, wherein the mapper is further configured to add keypoints to the stored object map based on the localization, if the keypoints have a correspondence with the first and the second sets of stored landmarks of the stored object map, if not, add the keypoints to the stored static map.

12. The imaging system of claim 1, further comprising:

a manipulator including a robot arm for manipulating the dynamic object based on the stored object map.

13. The imaging system of claim 1, wherein the sensor acquires the sequence of frames while in motion or stationary, and is from the group consisting one of a three dimensional (3D) sensor capable of acquiring a red color, a green color, a blue color, and a depth (RGB-D) image data, or other sensors capable of acquiring image data that is composed of intensity and depth.

14. An imaging system for localization and mapping of a scene including static and dynamic objects, wherein a sensor acquires sensor data while in motion, such that the data includes a sequence of frames and a memory stores a static map of one or multiple static objects in the scene and an object map of each dynamic object in the scene, wherein the static map includes a first set of stored landmarks, and the object map includes a set of stored segments, such that a descriptor of each of the stored set of segments is a function of multiple measurements forming the set of stored segments, the imaging system comprising:

a processor in communication with the sensor and the memory, is configured to obtain a set of segments from each frame of the acquired sequence of frames, and register the set of segments from each frame which are observed from different angles by computing of a similarity between newly observed and the set of stored segments, wherein each frame of the acquired sequence of frames includes a set of keypoints representing intensity including color and depth measurements of the scene;

employ a localizer to register at least some keypoints from the set of keypoints with corresponding landmarks in the stored static map using frame-based registration and to register at least some segments from the set of segments in each frame of the acquired sequence of frames with segments in the stored object map using a segment-based registration, wherein the landmarks correspond to discriminative points on an object in the scene, and wherein the segment-based registration performs appearance matching of segments in each frame of the acquired sequence of frames with the segments in the object map and geometric verification between matching segments, wherein the set of keypoints does not require hand-crafted point cloud filters because the frame-based registration rejects noise automatically; and a mapper to update each stored object map of each dynamic object in the scene with the at least some registered keypoints forming each segment and keypoints registered with the corresponding stored object map according to the segment-based registration, and to update the stored static map with the remaining keypoints in each frame of the acquired sequence of frames using the keypoints registered with the stored static map, wherein the reconstructed geometry is composed of unaltered intensity and depth measurements of the scene acquired from the sequence of frames.

15. The imaging system of claim 14, wherein the localizer is configured to extract features from each frame of the acquired sequence of frames;
    segment each frame of the acquired sequence of frames into multiple segments, wherein each segment includes multiple features extracted from the frame of the acquired sequence of frames;
    search the stored object map for matching segments in each frame of the acquired sequence of frames; and
    register a segment in each frame of the acquired sequence of frames with a matching segment in the stored object map.

16. The imaging system of claim 14, wherein the mapper is configured to add all registered keypoints of one or more of the set of segments to the stored object map that the segment is registered.

17. The imaging system of claim 15, wherein the mapper is further configured to add keypoints to that stored object map based on the localization, if the keypoints have a correspondence with the landmarks of the stored object map, if not, add the keypoints to the stored static map.

18. An imaging system for localization and mapping of a scene including static and dynamic objects, comprising:
    a sensor to acquire sensor data while in motion or stationary, such that the sensor data includes a sequence of frames;
    an input interface receives data;
    a memory in communication with the input interface, to store the received data that includes a static map of one or multiple static objects in the scene and an object map of each dynamic object in the scene, wherein the static map includes a first set of landmarks, and the object map includes a second set of stored landmarks and a set of stored segments, such that a descriptor of each of the stored set of segments is a function of multiple measurements forming the set of stored segments, and wherein the measurements of the frame further include at least three-dimensional (3D) planes;
    a processor in communication with the sensor, the memory and the input interface, is configured to
        obtain a set of segments from each frame of the acquired sequence of frames, and register the set of segments from each frame which are observed from different angles by computing of a similarity between newly observed and the set of stored segments, wherein each frame of the acquired sequence of frames includes a set of keypoints representing intensity including color and depth measurements of the scene;
        employ a localizer to register at least some keypoints from the set of keypoints with corresponding landmarks in the stored static map using frame-based registration and to register at least some segments from the set of segments in each frame of the acquired sequence of frames with segments in the stored object map using a segment-based registration, such that the segment-based registration includes (a) matching the segment in each frame of the acquired sequence of frames with the segments in the stored object map using an appearance similarity search, (b) matching the measurements of the segment with landmarks of matching segments from the object map, and (c) identifying a transformation between matching segment pairs following random sample consensus (RANSAC) framework function, wherein the set of keypoints does not require hand-crafted point cloud filters because the frame-based registration rejects noise automatically; and
    a mapper to update each stored object map of each dynamic object in the scene with the at least some registered keypoints forming each segment and keypoints registered with the corresponding stored object map according to the segment-based registration, and to update the stored static map with the remaining keypoints in each frame of the acquired sequence of frames using the keypoints registered with the stored static map, wherein the reconstructed geometry is composed of unaltered intensity and depth measurements of the scene acquired from the sequence of frames.

19. The imaging system of claim 18, wherein the localizer is configured to extract features from each frame of the acquired sequence of frames;
    segment each frame of the acquired sequence of frames into multiple segments, wherein each segment includes multiple features extracted from each frame of the acquired sequence of frames;
    search the stored object map for matching segments in each frame of the acquired sequence of frames; and
    register a segment in each frame of the acquired sequence of frames with a matching segment in the stored object map.

20. The imaging system of claim 18, wherein the mapper is configured to add all registered keypoints of one or more of the set of segments to the stored object map that the segment is registered; and
    add keypoints to that stored object map based on the localization, if the keypoints have a correspondence with the landmarks of the stored object map, if not, add the keypoints to the static map.

* * * * *